May 3, 1955

H. J. M. FORSTER 2,707,405

MECHANISM FOR AUTOMATICALLY CONTROLLING
MOTOR VEHICLE DRIVES

Filed Oct. 28, 1950

INVENTOR

HANS JOACHIM MAX FORSTER

By:
Haseltine, Lake & Co.
AGENTS

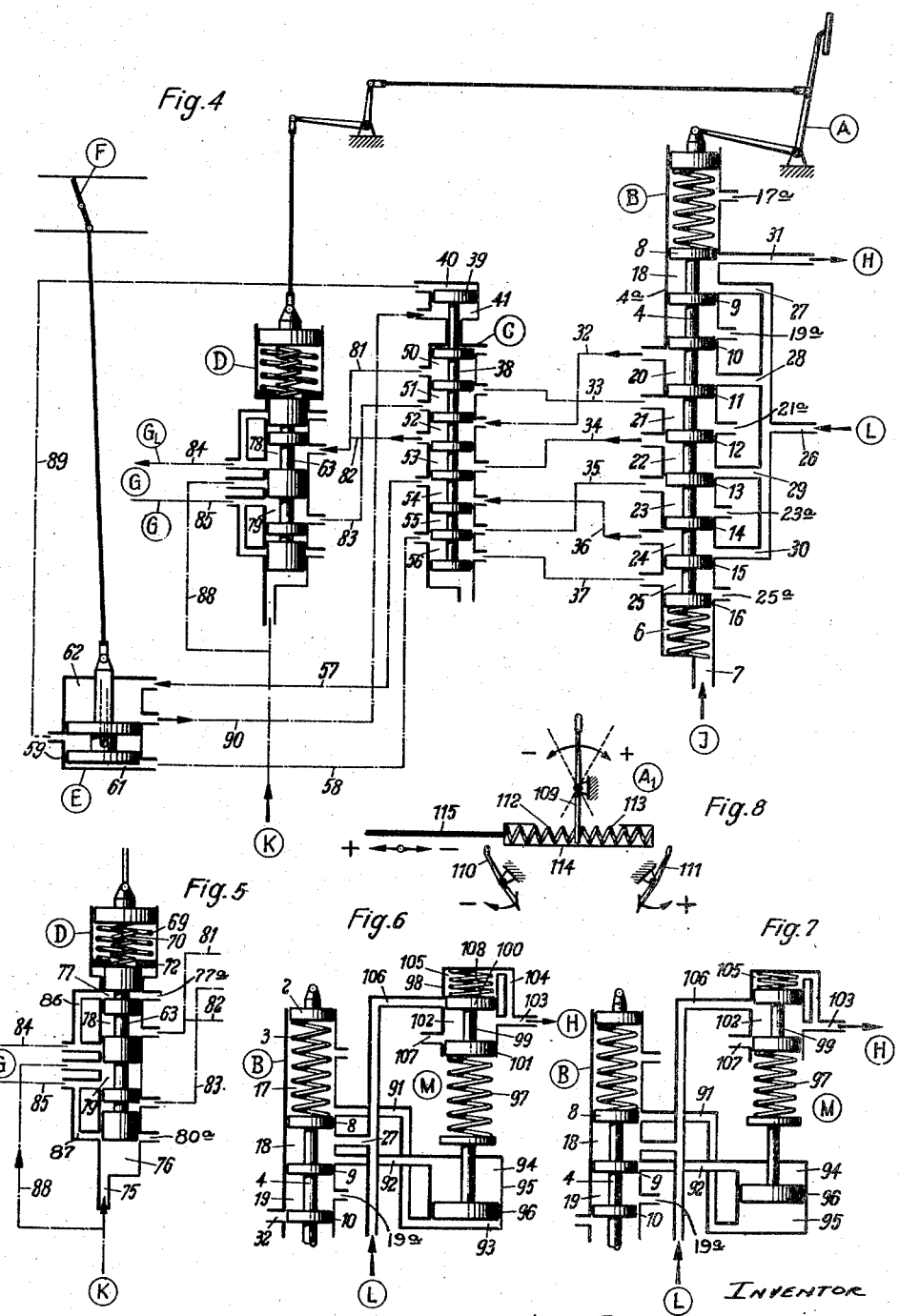

May 3, 1955  H. J. M. FORSTER  2,707,405
MECHANISM FOR AUTOMATICALLY CONTROLLING
MOTOR VEHICLE DRIVES
Filed Oct. 28, 1950  4 Sheets-Sheet 4
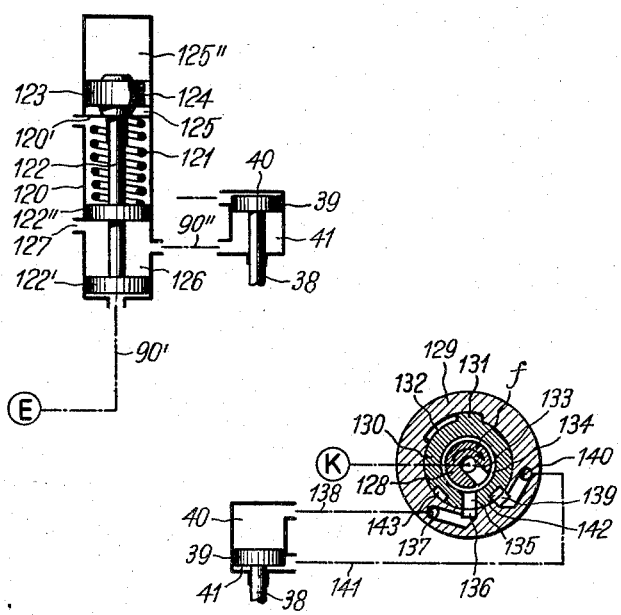
Fig. 9
Fig. 10
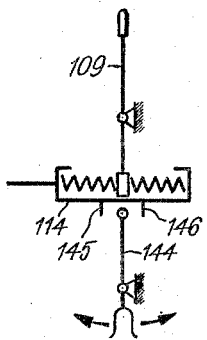
Fig. 11

United States Patent Office 2,707,405
Patented May 3, 1955

2,707,405

MECHANISM FOR AUTOMATICALLY CONTROLLING MOTOR VEHICLE DRIVES

Hans Joachim M. Forster, Harthausen a. F., Kreis Esslingen (Neckar), Germany, assignor to Daimler-Benz Aktiengesellschaft, Stuttgart-Unterturkheim, Germany Application October 28, 1950, Serial No. 192,718

Claims priority, application Germany October 31, 1949

22 Claims. (Cl. 74—472)

This invention relates to a method and mechanism for automatically controlling the operation of a motor vehicle.

The primary object of the invention is to provide for the simplified operation of such vehicles in particular to relieve the driver of the necessity of initiating and watching the control operation affecting the driving condition as much as this is at all posible by the provision of suitable automatic devices. Accordingly a further object of the invention consists in providing mechanism for controlling the operation of a motor vehicle, wherein the driver only has to preselect the desired driving condition, while it is left to the automatic operation of the controlling devices to adjust for and maintain this preselected driving condition.

A further object of the invention is to provide a combination of operating or controlling devices affecting the operating condition in response to an actual condition of the vehicle in such a manner that controlling takes place with the least possible fuel consumption, that is, with the highest possible economy.

Another object of the present invention is to provide mechanism for automatically controlling the operation of a motor vehicle, wherein a single control may be adjusted to a position corresponding to a desired or predetermined nominal speed, and the automatic controls of the various factors determining the actual vehicle speed then act to alter the actual speed, insofar as it is different from the nominal speed at any instant, to conform to the nominal speed and then to maintain the actual speed at the nominal speed provided that the latter is within the range of power of the engine.

Another object is to provide mechanism of the described character for automatically controlling the operation of a motor vehicle, wherein all of the factors controlling the actual speed of the vehicle are utilized in adjusting the actual speed to a predetermined nominal speed so that the most efficient acceleration and retardation of the vehicle is realized.

Still another object is to provide mechanism of the described character wherein the transmission ratio and engine power are employed as controls for bringing the actual driving speed into conformity with a preselected nominal vehicle speed, and wherein the vehicle brakes are automatically employed to reduce the actual vehicle speed in the event that the latter exceeds the nominal speed by an amount which is too great for adjustment by variation of the engine power and transmission ratio alone.

Still another object is to provide mechanism of the described character wherein the engine is automatically changed-over from a condition in which it drives the vehicle to a condition in which the engine acts as a brake when the actual vehicle speed exceeds a selected nominal vehicle speed by a predetermined amount.

Still another object is to provide mechanism of the described character, wherein the effectiveness of the various factors controlling the actual vehicle speed varies in proportion to the difference between the actual vehicle speed and the preselected nominal vehicle speed.

A still further object is to provide control mechanism of the described character wherein hunting of the control mechanism is avoided when the actual vehicle speed is at or near the preselected nominal vehicel speed.

A still further object is to provide control mechanism of the described character wherein, during normal operation at the preselected nominal vehicle speed, the power control for the engine is adjusted for full power output to obtain optimum fuel consumption.

A still further object is to provide automatic control mechanism of the described character, wherein control of the vehicle may be conveniently taken over by the operator to override the automatic control of engine, transmission and brakes when actual driving conditions require control of the vehicle in the usual manner.

While the present invention is particularly useful in connection with infinitely variable vehicle transmissions, it may be also employed in connection with multi-speed transmissions having five, six and more distinct transmission ratios.

Further features and advantages of the invention not specifically noted will appear from the following description taken in connection with accompanying drawings in which the invention is described by way of example in application to a vehicle with an Otto-cycle engine of the type in which, within extended limits, the power curve with full open throttle coincides with the line of optimum fuel consumption.

The invention relates, however, also to all kinds of vehicles and engines, for a control arrangement may be devised in accordance with the principle of the invention, by means of which the operation through the medium of a single-lever control may be achieved, for instance, in such a manner that with a parallel or a temporary parallel adjustment of the members affecting the driving condition a nominal speed may be maintained in the steady or uniform drive condition. Within the limits of the engine power which provides utmost economy and the power for varying speed operation all of the devices provided for control of the vehicle may be used simultaneously, either continuously or temporarily to obtain optimum acceleration or braking in accordance with the will of the operator.

In the drawings:

Fig. 4 shows the same arrangement in a condition where the required nominal speed has been surpassed;

Fig. 5 illustrates the condition of an element of the embodiment of Fig. 3 when the maximum allowable speed has been surpassed;

Fig. 6 is a fragmentary diagrammatic view of another embodiment of the invention for controlling the vehicle brakes and shown in the normal position of the mechanism, that is, with the brakes released;

Fig. 7 shows the mechanism of Fig. 6 conditioned for applying the vehicle brakes;

Fig. 8 shows an operating or control mechanism with a main operating member and two additional operating members for over-riding the control of the main control mechanism;

Fig. 9 is a fragmentary diagrammatic view of a portion of the arrangement in Figs. 3 and 4 and showing an additional delay device embodied therein;

Fig. 10 is a fragmentary diagrammatic view showing an alternative change-over device which may be employed in the arrangement of Figs. 3 and 4; and Fig. 11 is a diagrammatic view of a control mechanism which can be used in place of the mechanism of Fig. 8 for over-riding the action of the main control mechanism.

Figure 1:
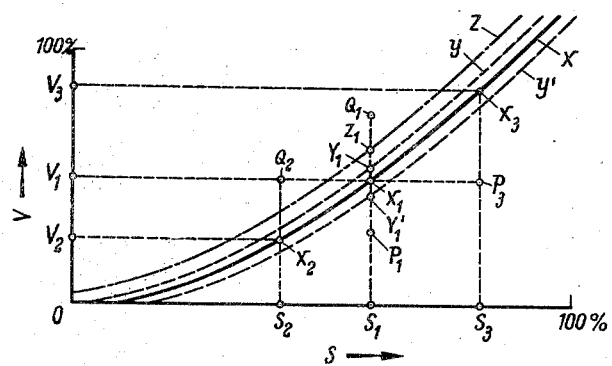
Fig. 1 is a chart correlating the position of the operating member with the driving speed of the vehicle for a control mechanism embodying the present invention and showing characteristic curves of the control operation.

Referring now to the chart of Fig. 1, the abscissas represent the displacement $s$ of the operating lever plotted as the percentage of its maximum travel, and the ordinates represent the actual speed $v$ of the vehicle.

In this chart the variable transmission control is characterized by the curve $x$, the engine power or throttle control for the regular engine operation by the curve $y$ and the breaking condition of the engine by the curve $y'$, and the vehicle brake control by the curve $z$.

The characteristic curves $x$, $y$, $y_1$ and $z$ of this chart are parallelly displaced with respect to each other, the curve $y$ being above the curve $x$, the curve $y'$ below the curve $x$, and the curve $z$ above the curve $y$.

The characteristic curve $x$ indicates the conditions of speed and displacement of the operating or control lever for which the transmission control is in a state of equilibrium. A condition represented by a point below this curve, in the regular driving condition, results in the actuation of the transmission control to provide a higher transmission ratio, while the occurrence of a condition represented by a point above the curve results in the actuation of the transmission control to produce a lower transmission ratio. With the engine acting as a brake, a reverse control action on the transmission will result, as will be explained hereinafter. With relation to the characteristic curves $y$ and $y'$, the occurrence of a condition represented by a point above said curves results in controlling to reduce the engine power (such as by closing the throttle), while a condition represented by a point below said curves produces controlling to increase the engine power (such as by opening a throttle). A deviation from the characteristic curve $z$ in the direction above the latter results in the application of the vehicle brakes.

If, for instance, the operating lever is adjusted to a position $s_1$ (corresponding to approximately 60% of its maximum displacement), the vehicle would adopt, in its steady drive condition, a driving or actual speed $v_1$ which corresponds to the nominal speed conditioned by the position $s_1$. The condition of the associated variable transmission is in this case characterized by the point $x_1$ on the characteristic curve $x$ for the transmission control. The point $y_1$ for the throttle control corresponding to the same position $s_1$ of the operating member is in the normal operation of the vehicle above the point $x_1$. This means that the speed $v_1$ is sensed by the control member adjusting the engine power (for instance, by acting on the throttle) as being too low so that it accordingly adjusts to maximum power, for instance, by moving the throttle to its full open position. Correspondingly the brakes will be so adjusted that they will be automatically applied in the lever position $s_1$ only if the speed has reached a value corresponding to the point $z_1$ on the characteristic curve $z$. At the speed $z_1$ the brakes will therefore be applied, the transmission and the throttle having, however, already responded to effect a speed reduction.

As distinguished from the above, in the case of using the engine as a brake, such as when going downhill, it will be noted that, owing to the fact that the characteristic curve $y'$ for engine braking conditions is located below the characteristic curve $x$ for the transmission control in the state of equilibrium of the transmission control corresponding to the curve $x$, the driving speed $v_1$ adjusted by the transmission control at a predetermined lever position $S_1$ will be sensed as being too high by the control member adjusting the engine power so that it will adjust to the minimum engine power, for instance, by moving the throttle into the fully closed position. Only after the driving speed has been reduced to the value corresponding to the point $y'$, will opening motion of the throttle result.

Since, starting from the characteristic curve $x$, the power control or throttle position of the engine will remain unaffected for deviations located between the characteristic curves $y$ and $y'$, such small variations or deviations of the driving speed will be compensated exclusively by the transmission control. It is, however, not absolutely necessary that below the curve $y$ the engine throttle is moved into its full open position and above said curve into its fully closed position, or that below the curve $y'$ the engine throttle is moved into its fully open position with the engine in braking condition. There may be provided, if desired, also a certain intermediate range within which only a partial opening or closing of the power control member or throttle will take place.

Suppose, for instance, there will be a sudden retarding action on the vehicle from a steady drive condition corresponding to the point $x_1$, for example, when entering upon an ascent or upgrade. This new drive condition is denoted, for instance, by the point $p_1$. Since this point is below the characteristic curves $x$, $y$, $z$, the transmission will be shifted into a higher transmission ratio, i. e. into a lower speed. The vehicle will thus again be accelerated until the driving condition corresponding to the point $x_1$, is again reached.

If, inversely the vehicle speed is accelerated, for instance, when entering upon a steep incline or down-grade, the point characterizing the driving condition or speed of the vehicle will be displaced vertically upwardly on the chart along the line $S_1$. This results, between the points $X_1$ and $Y_1$, in the shift or adjustment of the transmission to a higher speed. If the consequent reduction of the driving torque at the driving wheels effected in this way is not yet sufficient to reduce the speed to its former or nominal value $v_1$ and if the driving speed still exceeds the value corresponding to the point $y_1$, the control member for the engine power then begins to adjust to a reduced power which causes closing of the throttle. If this throttling action on the engine is still insufficient to restore the driving condition adjusted by the driver by means of the operating lever, i. e. the nominal speed $V_1$, so that a driving condition for instance, at the point $Q_1$, above the point $Z_1$ will ensue, a further counteraction against the excess speed of the vehicle will take place by the application of the brakes. As will be explained more fully hereinafter, the transmission control, however, will change-over simultaneously with the application of the brakes to actuate the transmission in the direction reducing the transmission ratio so that the braking action will be increased. This control action will continue until the vehicle again reduces its speed and the driving condition returns to the point $x_1$.

A similar result will be obtained if at a constant driving speed the position of the operating member, i. e. the nominal speed, is suddenly varied which means displacing of the characteristic point of the driving condition, for instance, from $x_1$ to $Q_2$. In this case the characteristic curves $x$, $y$ and $z$ will be below the characteristic point indicating the actual speed so that there will be a control action on the vehicle. Transmission, engine and brakes sense the driving speed $v_1$ as being too great for the setting $S_2$, and, as a result, the transmission is adjusted to a lower torque, i. e. to a higher speed and the engine throttle into its throttling or closed condition, while the brakes are simultaneously applied. The vehicle speed will consequently be reduced by a reduction of torque and power and by the application of the brakes until the characteristic point $x_2$ given by the lever position $s_2$ for the steady drive condition of the vehicle and the driving speed $v_2$ associated therewith will be reached.

Inversely, if the operating member is moved into a position $S_3$, while the vehicle is moving at the speed $V_1$, the drive condition will be represented by the point $P_3$, and the transmission will continue to be adjusted for a higher transmission ratio and a higher torque until the characteristic point corresponding to the lever position $s_3$ is reached at a driving speed $v_3$.

Depending upon the suddenness of the lever motion or the distance between the preceding lever position $s_1$ and the new lever positions $s_2$ or $s_3$, a more or less pronounced acceleration or retardation of the vehicle is obtained. If the lever motion from the position $s_1$ toward $s_2$ or $s_3$ takes place slowly, the driving condition of the vehicle will be varied more or less along the characteristic curve $x$, so that upon the motion of the lever from $s_1$ to $s_2$ or $S_3$ the engine throttle control does not produce any change in the throttle setting or position.

Figure 3:
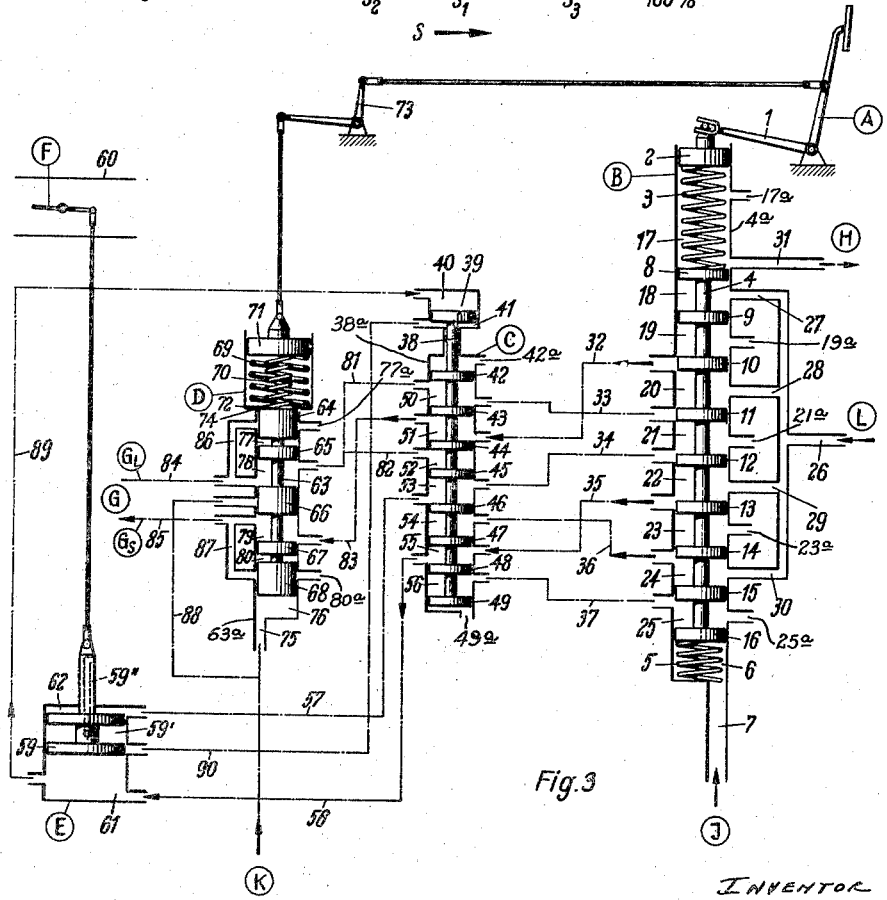
Fig. 3 is a diagrammatic view of one embodiment of the invention with the control mechanism in a condition of equilibrium, that is, when the actual vehicle speed is equal to the nominal speed determined by the position of the control member.
Figure 2:
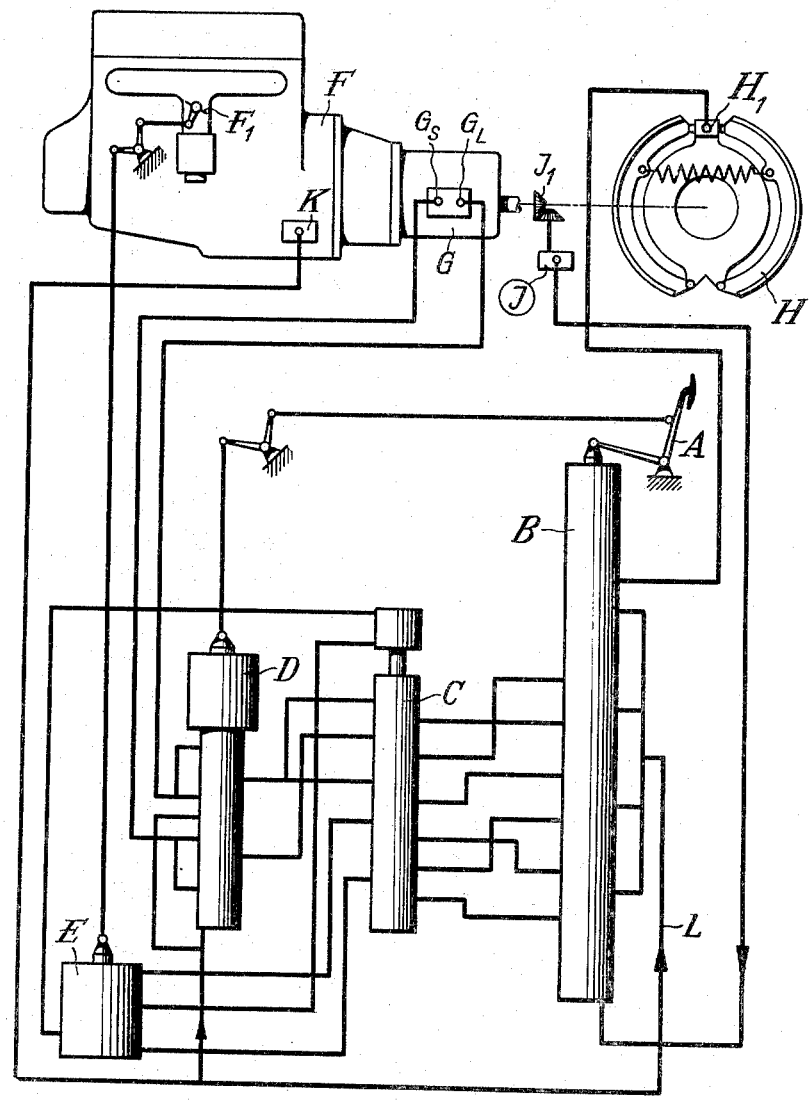
Fig. 2 is a diagrammatic view showing a control mechanism embodying the present invention operatively associated with the engine, transmission and brakes of an automotive vehicle.

In the arrangement of Figs. 2 and 3, a device is shown embodying the present invention to produce the features of operation discussed above in connection with Fig. 1, and comprises the following major elements: A denotes an operating member which may be a hand or foot-lever operated by the driver. B is a common control mechanism substantially consisting of a slide valve operative to control the distribution of a hydraulic pressure fluid. C is a change-over device for changing over from the driving condition of the engine to its braking condition in which the vehicle drives the engine. D is a limiting speed governor. E is an operating cylinder for a throttle F, of an engine F, and G is a transmission coupled to the engine and having supply conduits $G_L$ and $G_S$ leading to a suitable transmission control means, such as, a servomotor (not shown), the conduit $G_L$ being intended for stepping down, and the conduit $G_S$ for stepping up, of the gear ratio provided by the transmission. H denotes the vehicle brakes (Fig. 2) each having a brake applying cylinder $H_1$, while an oil pump J is driven, as at $J_1$, from the output shaft of the transmission G to provide oil under a pressure which varies in accordance with the actual speed of the vehicle. Another oil pump K is driven by the engine in advance of the transmission to provide a supply of oil which is under a pressure proportional to the engine speed, and the letter L on Fig. 3 represents a supply of pressure fluid which may be derived from either of the pumps J and K.

The operating lever A acts on the one hand, as diagrammatically illustrated in the drawing, by means of a lever 1 through a linkage or the like on a movable spring abutment 2 bearing against one end of a compression spring 3 which at its other end acts axially against a piston valve assembly 4 slidable in a valve housing 4a of the control mechanism B. This piston valve assembly 4 is, at its end remote from spring 3, under the action of a counter-spring 5 provided in a cylindrical space or pressure chamber 6 defined at one end of housing 4a and supplied through a conduit 7 by a device J, such as a pump, with pressure oil, the pressure of which varies in accordance with the actual driving speed of the vehicle, for example, in direct proportion therewith.

The piston valve 4 comprises nine piston-like elements 8, 9, 10, 11, 12, 13, 14, 15 and 16 defining separated control chambers 17, 18, 19, 20, 21, 22, 23, 24 and 25 therebetween. Piston element 16 separates chamber 25 from pressure chamber 6, while piston element 8 separates chamber 18 from a chamber 17 containing spring 3. The pressure oil controlling the throttle, transmission and brakes is supplied by a pump L which may be operated by the driven shaft of the transmission, and is admitted to valve housing 4a through a conduit 26 and distributed to the branch conduits 27, 28, 29 and 30 which in the position of the piston valve 4, shown in Fig. 3 of the drawing, discharge respectively into the control chambers 18, 20, 22, and 24. A line 31 extends from housing 4a and is positioned so that, with the piston valve 4 positioned as shown in Fig. 3, line 31 communicates with the chamber 17 which is exposed to the external air by a vent opening 17a. Line 31 leads to the oil pressure cylinders of a vehicle brake, such as a four-wheel brake.

The control chambers 19, 21, 23 and 25, with the valve assembly 4 in the position shown in Fig. 2, are exposed to the pressure of the external air by the vent openings 19a, 21a, 23a and 25a, respectively.

Branching off the cylinder or housing 4a of the control mechanism B there are lines 32, 33, 34, 35, 36 and 37 which communicate with a housing or cylinder 38a of the change-over device C.

A piston valve assembly 38 slidable in the housing 38a of the change-over device C has (with respect to the drawing) at its upper end a pressure piston 39 working in a chamber 39a, and the spaces 40 and 41 at the opposite sides of piston 39 are supplied with pressure oil in a manner described hereinafter so that the piston valve 38 will be moved alternatively into the one or the other of its extremes of axial displacement. The piston valve 38 is further provided with eight control pistons 42, 43, 44, 45, 46, 47, 48 and 49 between which control chambers 50, 51, 52, 53, 54, 55 and 56 are defined. The chambers above the control piston 42 and below the control piston 49, respectively, are in communication with the external air through suitable vent openings 42a and 49a.

Two lines 57 and 58 lead from the housing 38a and are arranged so that, with the piston valve assembly 38 positioned as in Fig. 2, lines 57 and 58 communicate control chambers 53 and 55 with the throttle control cylinder E in which a piston 59 is movably mounted. Piston 59 is connected to a suitable linkage for adjusting the throttle F in the induction pipe or inlet 60 of the engine in a manner so that, when a pressure fluid is delivered to the space 61 below the piston 59, the latter will be moved upwardly thereby opening the throttle F, while delivery of the pressure fluid to the space 62 above piston 59 will cause downward movement of the latter, thereby closing the throttle F.

The limiting speed governor D substantially comprises a control piston valve assembly 63 slidable in a housing 63a and including control pistons 64, 65, 66, 67 and 68, two springs 69 and 70 and the two spring abutments 71 and 72. The spring abutment 71 is in this case connected by means of a suitable linkage 73 to the operating member A and is displaced by the adjustment of the latter in the direction of axis of the springs 69 and 70 so that said springs are placed under a variable initial compression. The stronger spring 69 serves in this case to limit the maximum speed of the engine, while the comparatively weak spring 70 determines the lower speed limit of the engine. The inner spring 70 bears against the valve piston assembly 63 and urges the latter downwardly. The spring abutment 72 carries the outer spring 69 and rests against an abutment 74 of the housing 63a from which it may be lifted by the control piston 63 if the latter overcomes the action of the springs 69 and 70 under the pressure of pressure fluid entering the pressure chamber 76 through the line 75 from K and there acting upwardly against piston 68.

Between the control pistons 64, 65, 66, 67 and 68 the control chambers 77, 78, 79 and 80, respectively, are defined. Joined conduits 81 and 82 extend between the housings 38a and 63a and are arranged so that, with the piston valve assemblies 38 and 63 positioned as shown in Fig. 3, conduits 81 and 82 communicate chamber 78 with the control chambers 50 and 52. Further, a line 83 extends between the casings 38a and 63a and is arranged relative thereto so that, with the valve assemblies positioned as shown in Fig. 3, line 83 establishes communication of chamber 79 with the control chamber 51. Lines 84 and 85 extend from casing 63a and are arranged relative to the latter so that, with the valve assembly positioned as in Fig. 3, lines 84 and 85 provide connection between the control chambers 78 and 79, respectively, and the transmission control mechanism G, the actuation of which may be effected in any suitable manner by means of pressure oil and a servomotor (not shown). It is convenient to provide in this case an infinitely variable transmission. The pressure oil supplied by the line 84 will be active in this case to effect an increase of the driving torque, that is, to shift the transmission to a low speed ($G_L$), while the pressure oil supplied through the line 85 effects a transmission control in the direction for reducing the driving torque, that is, to shift the transmission to a high speed $G_s$, for instance, an overdrive.

Branch lines 86 and 87 lead from the lines 84 and 85, respectively, and connect to the cylinder 63a for the control piston 63 at locations selected so that, with the valve assembly positioned as in Fig. 3, the piston 64 and 68 respectively block branch lines 86 and 87, but with the valve assembly 63 displaced axially in either direction, for example, as in Fig. 5, the branch lines 86 and 87 alternatively communicate with the chambers 77 and 80, respectively, to subject the related line 84 or 85 to the external air pressure by communication with one or the other of the vent openings 77a and 80a. Further, a supply of pressure oil, the pressure of which varies in accordance with the speed of the engine, is carried by a line 88 which opens into housing 63a between lines 84 and 85 and may be in communication, for instance, with the line 75, the pump K, the pump L, or the like.

The cylinder E for the actuation of the throttle has branch lines 89 and 90 connected thereto. The line 89 leads from one point of the cylinder E, which in the event of the piston 59 being in its raised position, to open the throttle as in Fig. 3, is in communication with the space 61 below the piston, and extends therefrom to the space 40 above the piston 39 actuating the control piston valve assembly 38. The line 90 leading from cylinder E to the space 41 below piston 39, opens into cylinder E at a location so that it will be put in communication with the space 62 above piston 59 when the latter is lowered to the position of Fig. 4 in which the throttle is closed. In its central part the piston 59 is of reduced cross section so that an annular space 59' is there formed which is in communication with the external air through an axial passage 59'' formed in the stem of piston 59 and opening outside of cylinder E.

The relationship of the several parts and the mode of operation of the mechanism described above is as follows:

Since there is no fluid pressure supplied to the cylinder E to raise the piston 59 for opening the throttle valve F when the engine is at rest, it is necessary during starting of the engine to either over-ride the control of the throttle valve F by the piston 59 or by-pass the valve F for supplying air to the engine. Thus, the rod extending from the piston 59 to the valve F may have a resilient or spring section therein (not shown) and a manual control (not shown) may be provided for directly actuating the throttle valve F, or an auxiliary air inlet opening (not shown) may be provided in the inlet 60 between the throttle valve F and the engine, with this auxiliary opening being normally closed and opened manually only during starting of the engine and until the fluid pressure delivered to cylinder E acts to raise the piston 59 and open the main throttle valve F.

In Fig. 3 the control mechanism is illustrated in a steady drive condition of the vehicle, that is, with the vehicle travelling at a non-varying or uniform speed, for instance corresponding to the point $X_L$ of Fig. 1. The operating member A is, in the position $\alpha_L$ and the actual vehicle speed $v_L$ corresponds to the nominal speed so that the pressure fluid supplied at J counterbalances in the chamber 6 (together with the spring 5) the force of spring 3 compressed by abutment 2 actuated by the operating lever A. The pressure fluid supplied from L through the line 26 is distributed through the branch lines 27, 28, 29 and 30 to the control chambers 18, 20, 22, and 24 of the control valve piston assembly 4. With the assembly 4 in the position shown in Fig. 3, the pressure oil entering the chamber 18 is blocked by the piston 8 which separates line 31 leading to the brake H from the control chamber 18. Line 31 is instead in communication with the external air through the chamber 17 located above piston 8 and having a vent opening 17a. The vehicle brakes are accordingly released. The pressure oil entering from branch line 28 into the control chamber 20 is likewise prevented from continuing to flow since the lines 32 and 33 are just covered by the control pistons 10 and 11. The pressure oil entering the control chamber 24 from branch line 30, though being free to pass through the line 36 into the chamber 54 of the control piston 38, is stopped at the chamber 54 by the pistons 46 and 47 blocking outlet through either of lines 57 or 58. The pressure oil entering the control chamber 22 from branch line 29, however, will pass through the line 35 into the control chamber 55 defined between pistons 47 and 48 of the valve assembly 38 and from there through the line 58 into the space 61 below piston 59 in the throttle actuating cylinder E, so that the piston 59 will be moved into its raised position and the throttle opened or held in its open position. After the piston 59 has been somewhat lifted, the pressure oil is free to pass from space 61 through the line 89 into the space 40 above piston 39 of the control valve piston assembly 38 so that the latter will be moved into its lower position or held in this position. The change-over device C is now adjusted into the normal operation of the engine.

If the speed of the driven shaft of the transmission or the actual driving speed of the vehicle increases, this will have as a result an increase of the pressure of the pressure oil coming from J and entering through the line 7 into the space 6 so that the piston valve assembly 4 begins to move upwardly against the action of the spring 3. As appears in the drawing, the lines 32, 33, 34, 35, 36 and 37 do not discharge uniformly into their corresponding control chambers of the piston valve 4 with respect to the piston edges by which they are controlled, but are displaced in relation to said chambers and relatively to each other in such a manner that the lines 34 and 35 are higher, the lines 36 and 37 on the other hand lower than the lines 32 and 33 with respect to the piston edges by which they are controlled. That is, with the valve piston assembly 4 positioned as in Fig. 3 for uniform vehicle speed at the nominal or preselected speed, the lines 32 and 33 are level with and closed by the pistons 10 and 11, the lines 34 and 35 open slightly above the related pistons 12 and 13, and the lines 36 and 37 open slightly below the related pistons 14 and 15. An upward movement of the piston valve assembly 4 consequently results in progressive opening of the lines 32 and 33. In this way the line 32 is brought into communication with the control chamber 20 which is supplied with pressure oil by branch line 28 so that the pressure oil is delivered through the line 32 into the control chamber 51 of the change-over device C and from there through the line 83, the control-chamber 79 of the limiting speed governor D and the line 85 of the transmission control mechanism G to the shifting member $G_s$ of the latter. The transmission is therefore adjusted to a higher speed and lower torque condition. Simultaneously the line 33 has been placed in communication with the control chamber 21 exposed to the external air pressure by the vent 21a so that the line 84 and the shifting member $G_L$ are similarly exposed to atmospheric pressure through the communicating chamber 78, line 81, and the chamber 50 into which line 33 opens.

If the transmission control effected in this way is not sufficient to restore the vehicle to a condition of uniform speed, that is, if the speed of the vehicle continues to increase, the piston valve assembly 4 will be further moved upwardly until it reaches, for example, the position shown in Fig. 4. As a result of such further movement, the lines 34 and 35 now open into casing 4a slightly below the control pistons 12 and 13 of the piston valve assembly 4 (point Y₁ of Fig. 1) so that the oil under pressure entering chamber 22 from the branch line 29 now enters the line 34 instead of line 35 while the latter 35 is exposed to the external air pressure through chamber 23 and vent 23a. Since the piston valve assembly 38 is still in the position shown in Fig. 2, the pressure oil will pass from line 34 through chamber 53 and line 57 into the space 62 above piston 59 in cylinder E, thus causing a downward movement of the piston 59 and a closing movement of the throttle F. In this case the space 61 below piston 59 is in communication with the external air through line 58, chamber 55, line 35, chamber 23 and vent 23a.

If the maximum speed is attained before the throttle F has been completely closed and if the driving speed begins again to decrease after having reached said maximum speed in order to return to the nominal speed adjusted by the operating lever A, the piston valve 4 is again moved downwardly owing to the decrease in pressure in the chamber 6 until the previous steady drive or uniform speed condition is again obtained. However, if the speed further increases or continues to remain above the nominal speed V₁ adjusted by the driver or above the point Y₁ at which control of the throttle is effected, the pressure oil passes, as soon as the piston 59 has reached its lower position (Fig. 4), from the space 62 through the line 90 into the space 41 below piston 39 of the change-over device C so that the piston assembly 38 is moved upwardly to its other limit of axial movement, that is, into the position for "engine braking." At the same time the space 40 above piston 39 has been exposed to the pressure of the external air by communication of line 89 with the annular space 59' in the piston 59 which opens to the atmosphere through the axial bore 59. If desired, a retarding device (for instance a piston or the like, establishing the connection only after a predetermined travel) may be interposed in the line 90 between E and the space 41 so that the control piston assembly 38 will change-over into the braking condition of the engine only after a predetermined interval of time of, for instance, a few seconds after the throttle has been adjusted to its open position.

Such a delay or retarding device is illustrated, by way of example, in Fig. 9, wherein the line 90 is divided into two portions 90' and 90" which are connected to each other through a cylinder 120 having a dividing partition 120' therein. A slide valve 122 is disposed in the cylinder 120 and has control portions 122' and 122" disposed below the partition 120' and a control portion 123 in the part of the cylinder above the partition. The control portion 123 of the slide valve is provided with a restricted bore 124 extending therethrough and providing communication between the chambers 125' and 125" at the opposite sides of the control portion 123. A damping control fluid fills the chambers 125' and 125" at the opposite sides of the control portion 123 so that the slide valve 122 is retarded in its movement by the flow of the damping fluid through the restricted bore 124. The portion 90', of the line leading from E to the chamber 41, enters the cylinder 120 at the bottom thereof, and the line portion 90" extends from the side of cylinder 120 at a location in the lower portion of the latter. A spring 121 is interposed between the partition 120' and the control portion 122" of the slide valve to yieldably urge the latter downwardly to the position of Fig. 9. A return line 127 extends from the cylinder 120 at a location which provides communication with the space 126 between control portions 122' and 122" for all positions of the slide valve.

When there is no pressure in line portion 90', the spring 121 depresses the slide valve 122 so that the line 90" communicates with the space 126 above control portion 122' and the space 41 on one side of the piston 39 of slide valve is placed in communication with the return line 127 through line portion 90" and space 126 to relieve the pressure in the space 41. When pressure is applied to the line portion 90', such pressure acts against the control portion 122' of the slide valve 122 to move the latter upwardly against the spring 121, and the flow of damping fluid through the bore 124 delays this upward movement. After the valve 122 has been moved upwardly sufficiently to dispose the control portion 122' above the point at which the line portion 90" opens into the cylinder 120, the line portions 90' and 90" will be placed in communication with each other to apply the pressure to the space 41. It is apparent that the bore 124 can be calibrated to provide any desired time lag or delay in the establishment of communication between the line portions 90' and 90".

The new position of the control piston assembly 38 effected by this changing-over is illustrated in Fig. 4. By reason of this movement of assembly 38, that the line 32 communicates with the line 82 through the control chamber 52 and accordingly through the control chamber 78 and the line 84 with the shifting member G₁ of the transmission control, while simultaneously a connection is established between the line 33, which is exposed to the external pressure through chamber 21 and vent 21a and chamber 51, line 83, chamber 79, and line 85 leading to the shifting member G₅ of the transmission control.

Therefore, there will be an interchange of the connections between the lines 32, 33 and the lines 84 and 85 in such a manner that upon an upward movement of the piston valve assembly 4 the pressure oil entering through branch line 28, chamber 20 and line 32 is no longer delivered to G₅ but to G₁ so that with increasing driving speed the transmission will be adjusted in the direction of a lower ratio and slower speed. Therefore, if the vehicle assumes on a steep incline a driving speed exceeding the nominal speed the engine is automically changed over—if desired, after a predetermined interval of time—into its braking condition, in which the throttle is closed and a lower speed or gear ratio is engaged. The changing-over of the control piston assembly 38 simultaneously has the effect of communicating the line 36, instead of the line 34, with the line 57 and of communicating the line 37, instead of the line 35, with the line 58. Since the lines 36 and 37 are situated lower with respect to related control pistons 14 and 15 than the lines 34 and 35 with respect to their related control pistons 12 and 13 and also lower than the lines 32 and 33 with respect to their related control pistons 10 and 11, the throttle F will remain closed as the vehicle speed decreases to the nominal or preselected speed resulting in the position of valve assembly 4 shown in Fig. 3. This means, however, that a further decreased speed of the vehicle, that is, a speed causing a downward movement of the control piston assembly 4 beyond the position shown in Fig. 3 so that lines 36 and 37 are closed by pistons 14 and 15, will again cause shift of the transmission to a high speed by flow of pressure oil from branch line 28, through chamber 20, line 33, chamber 51, line 83 and chamber 79 to the line 85. A still further decreased speed moves assembly 4 further downward to cause the establishment of a connection between branch line 30 and line 37 through the control chamber 24 so that pressure oil is supplied through chamber 56 and line 58 to the bottom space 61 to move piston 59 upwardly and thereby again open the throttle F.

When piston 59 has been raised sufficiently so that line 89 opens into cylinder E in the space 61 below the piston, then pressure fluid flows through line 89 to space 40 above piston 39 to return the piston valve assembly 38 from its engine braking condition (Fig. 4) to its engine driving condition (Fig. 3).

Instead of controlling the changing-over of the control piston assembly 38 of the change-over device C in dependence upon the position of the throttle piston 59, changing over of the control piston assembly 38 may be effected also in dependance upon the direction of drive prevailing in the vehicle. An appropriate arrangement for achieving the above is illustrated in Fig. 10 wherein a drive shaft 128 and a hollow driven shaft 129 are connected to each other by a peripherally resilient coupling (not shown) of conventional construction for permitting limited angular displacement of the drive and driven shafts relative to each other. An intermediate ring 130 is interposed between the hollow driven shaft 129 and the drive shaft 128 and is frictionally coupled to the latter. A mechanical coupling connects the ring 130 to the shaft 129, for example, a key 131 is carried by the ring 130 and is received in a relatively wide slot 132 formed in the shaft 129 so that the ring 130 is permitted a limited angular displacement relative to the shaft 129. The shaft 128 has a center bore 133 to which pressure fluid is supplied in an appropriate manner, for example, from pressure source K and which is in communication with an annular groove 134 in the periphery of shaft 128. The intermediate ring 130 has a radial bore 135 which communicates, in the position shown for the ring 130, with a groove 136 and a longitudinal bore 137 in the driven shaft 129, which lead in suitable manner through line 138 to the space 40 on one side of slide valve 39.

In the other end position determined by the clearance of the key 131 in the slot 132 of the driven shaft 129, the radial bore 135 communicates with a groove 139 and a longitudinal bore 140 formed in the driven shaft and connected by the line 141 with the space 41 on the opposite side of slide valve 39.

Assuming that the motor rotates in the direction of the arrow f, the intermediate ring 130 will be frictionally actuated by the drive shaft 128 into the position shown in Fig. 10 where the key 131 is at the right hand end of the groove or slot 132. Thus, the pressure source K communicates through 133 to 138 with space 40 so that the shift slide valve 38 is held in its lower position. Space 41 communicates through 141, 140, and 139 with a return groove 142. If the motor is throttled down, so that the shaft 128 lags behind the shaft 129, the intermediate ring 130 is displaced relatively to the driven shaft 129 an amount equal to the clearance of the key 131 in the slot 132 in the direction opposite to the arrow f until the key 131 abuts against the left end of the slot 132. As a result of this shift of the intermediate ring 130, the bore 135 enters into communication with the groove 139 and therethrough with the space 141, while the space 40 comes into communication through 138, 137 and 136 with the return groove 143. The shift slide valve 38 therefore takes up its other upper position.

If the nominal speed adjusted by the operating member A is considerably surpassed, for example, if the actual speed reaches a value corresponding to point $Q_1$ on Fig. 1, and consequently the piston valve assembly 4 is correspondingly moved upwards to or beyond the position shown in Fig. 4, the control chamber 18 is put into communication with the line 31 leading to the brake or brakes H so that the latter are applied until the speed again begins to decrease, and the line 31 is again brought into communication with the external air through chamber 17 and vent 17a. In order to permit an arbitrary application of the brakes by the driver, brakes other than those applied by pressure oil in line 31 or the same brakes may be used since the latter at any time can be supplied with pressure oil by a separate hand- or foot-operated valve device (not shown).

The mode of operation of the limiting speed governor D is as follows:

In the normal position of the control piston assembly 63 illustrated in Fig. 3, the latter is forced upwardly under the action of the pressure produced by the pump K into abutment with the spring support 72. If the speed of the engine exceeds the admitted speed or, in other words, if the pressure in the chamber 76 produces a force against piston 68 which is higher than the combined force, exerted by the springs 69 and 70, the control piston is lifted against the action of the springs, as shown in Fig. 5. This interrupts the connection of the lines 81 and 82 and the line 83 with the lines 84 and 85, respectively, and exposes the line 84 through by-pass line 86, space 77 and vent 77a to the external air pressure, while the line 85 is connected through space 79 with the pressure line 88 and which communicates with the pressure oil source. The transmission will therefore be adjusted to a high transmission ratio resulting in a reduction of the engine speed. The limiting speed at which this reduction will take place is controlled by the position of the operating lever A in such a manner that with increasing displacement s of the latter from its zero or neutral position the springs 69 and 70 will be subjected to a higher initial compression, and therefore the limiting speed increased (for instance from 1000 R. P. M. in idling to 2500 or 3000 R. P. M. with $s=100\%$).

If, inversely, the engine speed decreases below a predetermined minimum value (for instance below 100–1500 R. P. M.) the pressusre in the chamber 76 will not be sufficient to balance the action of the spring 70. The control piston 63 is forced downwardly by spring 70, the line 85 exposed through 80 by-pass line 87, space 80 and vent 80a to the external air pressure and the line 84 connected through space 78 to the pressure line 88 and hence to the source of pressure K. The transmission is therefore stepped down to a lower transmission ratio independently of the position of the piston valve assembly 4 or of the control piston assembly 38 which at a constant speed of the driven shaft of the transmission or of the vehicle corresponds to an increase of the engine speed and results owing to the increase in power associated therewith in a closing action of the throttle or the like.

In Figs. 3 and 4 the automatic application of the vehicle brakes H is effected only through the line 31 which is normally exposed to the external air pressure and, when the brakes are applied, is subjected to the oil pressure. A more precise control operation by means of a servo-brake mechanism M is shown in Fig. 6.

Instead of a single line 31, two lines 91 and 92 extend from casing 4a and are controlled by the control pistons 8 and 9, said lines 91 and 92 leading into the piston chambers 93 and 94, respectively, at opposite sides of a piston 96 slidably mounted in a cylinder 95. The piston 96 acts against one end of a spring 97 which at its other end abuts against a control piston assembly 99 comprising the control pistons 100 and 101 sliding in a cylinder 98. The control chamber 102 defined between pistons 100 and 101 is in communication with the brakes (H) through the line 103, and the brakes H also connect through a by-pass line 104, with a piston chamber 105 above piston 100. The pressure oil enters cylinder 98 through a line 106, for instance, connected to the pump L, and may be discharged from cylinder 98 at 107. A light spring 108 tends to force downwardly the control piston 99.

The line 91 and consequently the piston assembly chamber 93 below piston 96 is normally connected, as shown in Fig. 6, to the chamber 17, so that it is exposed to the external air pressure, while the chamber 94 is subjected to the oil pressure through line 27, chamber 18 and line 92. When the piston 96 is in its lower or normal position, the spring 97 is released and the control piston assembly 99 is forced downwardly by the spring 108. The brakes H are then exposed to the external air pressure through 107 and consequently released.

If the actual speed of the vehicle exceeds the nominal speed by such a great extent that the piston valve assembly 4 is lifted to position piston 8 above line 91 and piston 9 between branch line 27 and line 92 and thereby establishes a communication of the line 91 and of the chamber 93 respectively with the pressure oil containing chamber 18, while the chamber 94 is exhausted through line 92, chamber 19 and vent 19a, the piston 96 begins to move upwardly and to compress the spring 97. The control piston 99 is likewise forced upwardly so as to uncover the line 106 to permit entrance of pressure oil into the space 102. The brakes H begin to seize. Since the pressure is transmitted also to the chamber 105 through by-pass 104 it counteracts simultanaeously the presssure of the spring 97 and tends to displace piston assembly 99 in the downward direction to close again the pressure line 106 and to open the line 107 leading to the external air. Therefore a state of equilibrium will be established between the spring 97 and the pressure in the control chamber 102 and in the braking system respectively, said state of equilibrium (Fig. 7) being determined by the position of the piston 96 and the tension of the spring 97. (Fig. 6). The braking pressure will increase only gradually with the stroke of the piston 96. If accordingly the driving speed decreases again before the piston 96 has reached its upper end position, the braking action decreases too before having reached its maximum strength. In this way a smooth brake control action related to the condition of drive may be obtained.

In Fig. 8 is diagrammatically shown an operating device A₁ in which in addition to the main operating member, for instance, a hand-lever 109, two additional operating members, for instance, two foot-operated levers 110 and 111 are provided. The hand-lever 109 in this case acts through the medium of two biassed springs 112 and 113 on a sleeve 114 connected to a linkage 115, which, for instance, may adjust the spring abutment 2 of the control device B and the spring abutment 71 of the limiting speed governor D.

Normally, the brake levers 110 and 111 are out of engagement with the sleeve 114 so that the hand-lever 109 may be freely swung thus permitting the adjustment of the nominal speed by displacing sleeve 114 through the medium of the springs 112, 113. If it is, however, desired to increase or to reduce the driving speed without the necessity of adjusting the hand-lever, for instance, in order to go around an obstacle, or to pass another vehicle, this may be achieved by actuating the foot-levers 110 and 111 respectively. In this case the hand-lever 109 may remain in its adjusted position, while the linkage 115 is adjusted by the levers 110 and 111 acting on sleeve 114 and the springs 112 and 113 are correspondingly deflected, thus temporarily varying the nominal speed. Upon release of the foot-lever 110 or 111 the original position of the linkage 115 and thus the adjustment to the norminal speed determined by the hand-lever 109 is again restored.

There may be provided, of course, instead of two oppositely arranged levers 110 and 111, other levers arranged in juxtaposition and acting through suitable devices for temporarily over-riding the control imposed by the lever A of Fig. 2. For example, instead of the levers 110 and 111 of Fig. 8, a single lever 144 may be provided, as shown in Fig. 11. The lever 144 is resiliently held in an intermediate position and extends between two spaced apart abutments 145 and 146 on the sleeve 114. When the single lever 144 is rocked, as indicated by the arrows, it comes into engagement with one or the other of the abutments 145 and 146 to adjust the position of the sleeve 114 independently of the hand-lever 109.

While this description has reference to particular forms of the invention, it will be obvious that various other forms and modifications may be resorted to without departing from the scope of the invention.

What I claim is:

1. A mechanism for controlling the speed of a motor vehicle having an engine and a transmission with a variable transmission ratio; comprising an operating member movable to selected positions corresponding to predetermined nominal vehicle speeds, control means including a displaceable control member, means acted upon by said operating member for influencing the position of the control member in one direction of adjustment and to a degree dependent upon the position of said operating member, means for influencing the position of the control member by the actual vehicle speed in the other direction of adjustment so that the control member at any time assumes a certain balanced position, means for varying the transmission ratio, means for varying the engine power, and means operatively connected to said control means for influencing said two last mentioned means in dependence upon the position of the control member.

2. A mechanism as defined in claim 1, wherein said means for influencing said two last mentioned means are arranged and operatively associated with said control member so that, with actual vehicle speed increasing from said nominal speed and with substantially unthrottled engine power, first the transmission ratio is varied and only then upon further increasing actual vehicle speed the engine power is throttled.

3. A mechanism as defined in claim 1, wherein said control means are hydraulic.

4. Mechanism for hydraulically controlling motor vehicle drives with an engine, means for controlling the power of said engine, a transmission having a variable transmission ratio, means for varying the transmission ratio, brake means and means through the medium of which said brake means can be applied, comprising an operating member movable through selected positions corresponding to predetermined nominal vehicle speeds, nominal speed, a control member for a hydraulic pressure fluid, a supply line for said pressure fluid, means responsive to said operating member for influencing the position of the control member in one direction of adjustment and to a degree dependent upon the position of said operating member, means for influencing the position of the control member by the actually prevailing driving speed in the other direction of adjustment so that the control member at any time is capable of being held in a certain balanced intermediate position by the counteraction of said two influencing means, lines controlled by said control member leading to the means for controlling the engine power of which the one provides an increase of power and the other a reduction of power, lines controlled by said control member leading to the means for varying the transmission ratio the one line of which serves for stepping up and the other for stepping down the last mentioned means, a line leading to the means for actuating the brake means, all of these lines being associated with the control member such that in said predetermined intermediate position of balance the engine is adjusted through the medium of the one of said first mentioned lines to full power and that upon adjustment of the control member owing to increasing driving speed first the line for the stepping up of the transmission, thereupon the line for throttling the engine and then the line for the actuation of the brake is put into communication with the pressure fluid supply line and that upon adjustment of the control member in the opposite direction the line for stepping down the transmission ratio is connected to the pressure fluid supply line.

5. A mechanism as defined in claim 4, in combination with means through the medium of which the lines for controlling the engine power are connected to the control member such that in said intermediate position of balance the line for throttling the engine power is connected to the pressure fluid supply line and that upon adjustment of the slide valve in the last mentioned opposite direction the line for effecting an increase in power of the engine is connected to the pressure fluid supply line and further the connections of the lines for varying the transmission ratio with the control member are substantially interchanged.

6. A mechanism for controlling the speed of motor vehicles comprising an engine, a transmission coupled to said engine for effecting a variable transmission ratio, means for establishing forces corresponding to a predetermined nominal vehicle speed, and means controlling the engine power and the transmission ratio in dependence upon the actually prevailing vehicle speed and in dependence upon said forces corresponding to said nominal vehicle speed for adjusting the actual vehicle speed to the predetermined nominal speed.

7. A mechanism as defined in claim 6, further comprising means operative, when a predetermined limited vehicle speed is surpassed, to effect a stepping up of the transmission ratio independently of the otherwise controlled condition of drive.

8. A mechanism for controlling the speed of a motor vehicle, comprising an engine, a transmission having a variable transmission ratio, operating means movable through selected positions corresponding to predetermined nominal vehicle speeds, control means for varying the transmission ratio, means for influencing said control means in one direction in dependence upon the position of said operating means, means for influencing the control means in the opposite direction in dependence upon the actual vehicle speed, and means operative when a predetermined limited speed of the engine is surpassed, to effect a stepping up of the transmission ratio independently of the otherwise controlled condition of drive.

9. A mechanism as defined in claim 8, further comprising means operative to vary said limiting speed of the engine in accordance with variations in said control conditions characteristic of a predetermined nominal speed.

10. A mechanism as defined in claim 8, wherein said last mentioned means are constructed and arranged to be also operative to vary the transmission ratio when the engine speed decreases below another predetermined limiting speed.

11. A mechanism for controlling the speed of a motor vehicle having an engine and a transmission with a variable transmission ratio; comprising an operating member movable to positions corresponding to predetermined nominal vehicle speeds, control means including a displaceable control member, means acted upon by said operating member for influencing the position of said control conditions characteristic of a control member in one direction of adjustment and to a degree dependent upon the position of said operating member, means for influencing the position of said control member in response to the actual vehicle speed in the other direction of adjustment so that the control member at any time assumes a certain balanced position, means for varying the transmission ratio, means for influencing said transmission varying means in dependence upon the position of said control member, means for supplying a hydraulic pressure fluid to said control means to be directed by said control member, means for varying the engine power including a movable throttle, and means for controlling said throttle including a cylinder having a piston movable therein and connected to said throttle and two lines opening into said cylinder and operative to be alternatively supplied with said pressure fluid by said control member, said two lines being in communication with the spaces in said cylinder at the opposite sides of said piston so that, up to a predetermined intermediate position of said control member, the space at one side of said piston receives pressure fluid whereby said throttle is constantly held in open position, and after said control member has passed that intermediate position, in response to increased actual vehicle speed, the opposite side of the piston is exposed to the pressure fluid thereby adjusting the throttle to its closed position.

12. A mechanism for controlling the speed of a motor vehicle having an engine and a transmission with a variable transmission ratio; comprising an operating member movable to positions corresponding to predetermined nominal vehicle speeds, control means including a displaceable control member, means acted upon by said operating member for adjusting the position of said control conditions characteristic of a control member in one direction and to a degree dependent upon the position of said operating member, means for adjusting the position of said control member in the opposite direction in response to the actual vehicle speed so that the control member assumes a balanced position determined by the relationship between the actual and nominal vehicle speeds, means for varying the transmission ratio, means for varying the engine power, means for influencing said transmission ratio and engine power varying means in dependence upon the position of said control member, the last mentioned means being cooperatively associated with said control member so that, with the actual vehicle speed increasing from a predetermined intermediate value and with the engine power substantially unthrottled, first the transmission ratio is varied, and only after further adjustment of said control member is the engine power throttled, and so that with adjustment of said control member resulting from the actual vehicle speed decreasing from said intermediate value, the transmission ratio is varied, and means operative to substantially throttle the engine power at an actual vehicle speed corresponding to said intermediate position of the control member only when the actual vehicle speed is decreasing.

13. A mechanism for controlling the speed of a motor vehicle having an engine and a transmission with a variable transmission ratio; comprising an operating member movable to positions corresponding to predetermined nominal vehicle speeds, control means including an adjustable slide valve having means for supplying a pressure fluid connected thereto, means acted upon by said control conditions characteristic of an operating member for adjusting said slide valve in one direction and to a degree dependent upon the position of said operating member, means for adjusting said slide valve in the opposite direction in accordance with the actual vehicle speed so that the slide valve at all times assumes a balanced position determined by the relationship of said nominal and actual vehicle speeds, means for varying the transmission ratio, means for varying the engine power, and means operatively connected to said control means for influencing said transmission ratio and engine power varying means, the last mentioned means including a plurality of conduits for conveying the pressure fluid from said slide valve and arranged and offset relative to control edges formed on the latter so that, when said slide valve is displaced in one direction from a neutral position, first a conduit is opened to the pressure fluid for effecting stepping up of the transmission ratio and, only after further displacement of said valve in said one direction, another conduit is opened to the pressure fluid for effecting throttling of the engine power, and so that, when the slide valve is displaced in the opposite direction another conduit is opened to the pressure fluid to effect stepping down of the transmission ratio.

14. A mechanism for controlling the speed of a motor vehicle; comprising an engine, a transmission having a variable transmission ratio, operating means movable to positions corresponding to predetermined nominal vehicle speeds, control means for varying the transmission ratio, means for influencing said control means in one direction to a degree depending upon the position of said operating means, means for influencing the control means in the opposite direction in dependence upon the actual vehicle speed, slide valve means adapted to control variation of the transmission ratio so that the transmission ratio is stepped up upon adjustment of said valve means in one direction and stepped down upon adjustment of said valve means in the opposite direction independently of the otherwise controlled condition of drive, means for effecting adjustment of said valve means in said one direction in response to the engine speed, resilient means connected to said operating means for adjusting said valve means in said opposite direction to a degree dependent upon the position of said operating means, said resilient means comprising two spring elements interposed between said operating means and respectively the slide valve means and an abutment removable within predetermined limits and projecting into the path of travel of said slide valve means to be displaced by the latter against the action of the spring engaging said abutment when the engine speed exceeds a predetermined value, said slide valve means moving away from said abutment under the action of the other of said springs when the engine speed decreases below another predetermined value.

15. A mechanism for controlling the speed of motor vehicles comprising an engine, a transmission coupled to said engine for effecting a variable transmission ratio, an operating member movable to selected positions corresponding to related and predetermined nominal vehicle speeds, control means for controlling the engine power and the transmission ratio, first force exerting means connected to said operating member and adjustable by the latter, and second force exerting means of the vehicle and varied in accordance therewith, said control means being operatively associated with said first and second force exerting means in a manner so that, with the vehicle moving uniformly at the predetermined nominal speed, said control means is conditioned to respond to small deviations from said nominal speed by varying the transmission ratio alone and to vary the engine power only in response to deviations of the actual speed from said nominal speed which exceed predetermined amounts.

16. A mechanism according to claim 15; wherein the engine has a throttle for varying the power output thereof, and further comprising means interposed between said throttle and said control means for influencing the position of the throttle in response to the condition of said control means, the last mentioned means being operative to dispose said throttle in its full-open position when the vehicle is moving uniformly at said nominal speed.

17. A mechanism according to claim 15; wherein the engine has a throttle for varying the power output thereof, and further comprising means interposed between said throttle and said control means for influencing the position of said throttle in response to the condition of said control means, the last mentioned means being arranged so that, with the vehicle moving uniformly at the predetermined nominal speed, said throttle is normally held in its full-open position, and means cooperatively coupled to said last mentioned means for effecting closing of the throttle from said normal full-open position of the latter.

18. A mechanism according to claim 6; further comprising brake means, and means operatively interposed between said controlling means and brake means so that the latter are influenced by said controlling means in dependence upon the actually prevailing vehicle speed and said forces corresponding to the predetermined nominal vehicle speed.

19. A mechanism according to claim 6; wherein said means for establishing forces corresponding to a predetermined nominal vehicle speed includes a single operating member movable to adjust said forces and providing for the normal supervision over the vehicle speed.

20. A mechanism according to claim 6; further comprising means for rendering said controlling temporarily inactive.

21. A mechanism according to claim 6; wherein said means for establishing forces corresponding to a predetermined nominal vehicle speed includes a single operating member movable to selected positions corresponding to related nominal vehicle speeds, spring means, and means operated by said operating member and acting on said spring means to vary the force exerted by the latter in response to movement of said operating member; and wherein said controlling means includes a control member urged in one direction by said spring means and means acting in the opposite direction on said control member with a force proportional to the actual vehicle speed; and further comprising means for directly displacing said control member and overriding the forces which are exerted by said spring means and proportional to the actual vehicle speed, respectively.

22. A mechanism according to claim 6; further comprising brake means and brake applying means operatively interposed between said brake means and said controlling means so that the brake means are controlled in dependence upon the actual vehicle speed and said forces corresponding to a predetermined nominal vehicle speed, said brake applying means being operative to apply the brake means with a force which increases with increase in the actual vehicle speed.

References Cited in the file of this patent

UNITED STATES PATENTS

| Number | Name | Date |
|---|---|---|
| 2,086,723 | Maybach | July 13, 1937 |
| 2,089,590 | Walti | Aug. 10, 1937 |
| 2,102,781 | Bieretz | Dec. 21, 1937 |
| 2,120,104 | Livermore | June 7, 1938 |
| 2,177,904 | Maybach | Oct. 31, 1939 |
| 2,181,647 | Wheaton | Nov. 28, 1939 |
| 2,203,296 | Fleischel | June 4, 1940 |
| 2,352,212 | Long | June 27, 1944 |
| 2,516,203 | Greenlee | July 25, 1950 |
| 2,516,208 | Hasbany | July 25, 1950 |
| 2,523,726 | Seeger | Sept. 26, 1950 |
| 2,599,387 | Hefel | June 3, 1952 |